United States Patent [19]
Nowak

[11] Patent Number: 5,903,826
[45] Date of Patent: May 11, 1999

[54] EXTREMELY HIGH FREQUENCY MULTIPOINT FIXED-ACCESS WIRELESS COMMUNICATION SYSTEM

[75] Inventor: Richard Joseph Nowak, Nepean, Canada

[73] Assignee: Northern Telecom Limited, Montreal, Canada

[21] Appl. No.: 08/761,213

[22] Filed: Dec. 6, 1996

[51] Int. Cl.[6] ........................................ H04B 7/10
[52] U.S. Cl. ................ 455/277.1; 455/275; 455/562; 342/367; 342/374; 375/347
[58] Field of Search ......................... 455/277.1, 277.2, 455/133, 134, 25, 562, 504, 272, 275; 342/367, 374; 375/347

[56] References Cited

U.S. PATENT DOCUMENTS

| | | | |
|---|---|---|---|
| 4,087,818 | 5/1978 | Kruetel, Jr. ........................ | 343/176 |
| 4,513,412 | 4/1985 | Cox ................................... | 455/134 |
| 4,549,311 | 10/1985 | McLaughlin ...................... | 455/277.1 |
| 4,747,160 | 5/1988 | Bossard ............................. | 455/33 |
| 5,117,236 | 5/1992 | Chang et al. ..................... | 342/367 |
| 5,280,297 | 1/1994 | Profera, Jr. ....................... | 343/754 |
| 5,303,240 | 4/1994 | Borras et al. ..................... | 370/95.3 |
| 5,327,093 | 7/1994 | Bolla et al. ....................... | 329/308 |
| 5,430,769 | 7/1995 | Patsiokas et al. ................ | 375/347 |

FOREIGN PATENT DOCUMENTS

| | | |
|---|---|---|
| 0715478 | 5/1996 | European Pat. Off. . |
| 0788284 | 6/1996 | European Pat. Off. . |
| WO9202996 | 2/1992 | WIPO . |

OTHER PUBLICATIONS

T. Benkner, et al. "Investigating of Mobile Antenna Diagrams on Cochannel Interference", pp. 199–202.
Anthony S. Acampora, et al. "A Metropolitan Area Radio System Using Scanning Pencil Beams", IEEE Transactions on Communications 39(1991) Jan., No. 1, pp. 141–151.
W.C. Jakes, "Mobile Radio Systems" *Microwave Mobile Communications*, pp. 382–386, (1974).

*Primary Examiner*—Wellington Chin
*Assistant Examiner*—Lee Nguyen

[57] ABSTRACT

A subscriber antenna for use in a super high frequency multipoint fixed-access wireless system is provided which has several individually selectable directional antenna facets. The antenna is deployed in a cellular environment. The performances of the signals received by the antenna facets are prioritized, and the best performing facet is selected as a default facet. The antenna is particularly suited for use in a cellular system employing basestations sectorized by polarization to provide basestation diversity.

13 Claims, 7 Drawing Sheets

EXTREMELY HIGH FREQUENCY MULTIPOINT FIXED-ACCESS WIRELESS COMMUNICATION SYSTEM

FIELD OF THE INVENTION

The invention relates to a fixed-access wireless communications system and more particularly to subscriber equipment for use in such a system.

BACKGROUND OF THE INVENTION

In multipoint fixed-access wireless communications systems it is common to have a series of basestations distributed across a service area. Each subscriber to such a system has a directional antenna which is focussed on the basestation nearest to it to provide a radio link between the subscriber equipment and the system. The radio links are high frequency links designed through sophisticated link engineering to compensate for RF signal attenuation due to precipitation, attenuation due to foliage, as well as other sources. A disadvantage of such systems is that when a new subscriber is to be connected to the system, a technician is required to visit the subscriber site and manually adjust the directional antenna in order to achieve an acceptable link. Buildings or trees which appear subsequent to an initial manual adjustment of the directional antenna may require subsequent visits by the technician to make further adjustments. This is a very costly approach to establishing and maintaining a link.

Another disadvantage of existing systems is that when a large number of subscribers are located close to a specific basestation, it is possible that the traffic to that basestation will be much larger than the traffic to an adjacent basestation, possibly resulting in congestion.

A further disadvantage of existing systems is that to utilize the full available frequency spectrum at a given basestation, among other complications, entails the use of a combination of frequency hopping, under-provisioning (utilizing less than 100% of the spectrum for simultaneous traffic) and voice activity detection.

SUMMARY OF THE INVENTION

It is an object of the invention to provide a method and apparatus for connecting a fixed-access wireless subscriber equipment to a service provider which obviates or mitigates one or more of the above disadvantages.

According to a first broad aspect, the invention provides a directional antenna system for allowing access from a subscriber location to a fixed-access wireless communications system having a plurality of basestations, the system comprising: a plurality of angularly spaced directional antenna facets; receiving means for receiving from an antenna facet selected from said plurality of antenna facets an RF signal generated by one of the basestations; performance measuring means for determining the performance of each antenna facet; and subscriber prioritizing means for prioritizing the performance of all of the antenna facets and selecting as a default configuration the best performing antenna facet.

According to a second broad aspect, the invention provides a fixed-access wireless communications system comprising: a plurality of basestations each having a corresponding primary cell radius and secondary cell radius the primary radius being the minimum cell radius such that an entire service area is covered by at least one cell, the secondary radius being the actual coverage radius; at least one subscriber equipment apparatus comprising: i) a plurality of angularly spaced directional antenna facets; ii) receiving means for receiving an RF signal generated by one of the basestations from an antenna facet selected from said plurality of antenna facets; iii) performance measuring means for determining the performance of each antenna facet; and iv) subscriber prioritizing means for prioritizing into a list the performance of all of the antenna facets and selecting one of these as a default configuration to be used for reception.

According to a third broad aspect, the invention provides a directional antenna system for allowing access from a subscriber location to a fixed-access wireless communications system having a plurality of basestations, the system comprising: an antenna rotatable to a plurality of spaced angular positions; receiving means for receiving from the antenna facet oriented at a selected angle an RF signal generated by one of the basestations; performance measuring means for automatically selecting each spaced angular position and for determining the performance of the antenna at each selected position; and subscriber prioritizing means for prioritizing the performance of the antenna at each of said spaced angular positions and selecting as a default configuration the best performing antenna position.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
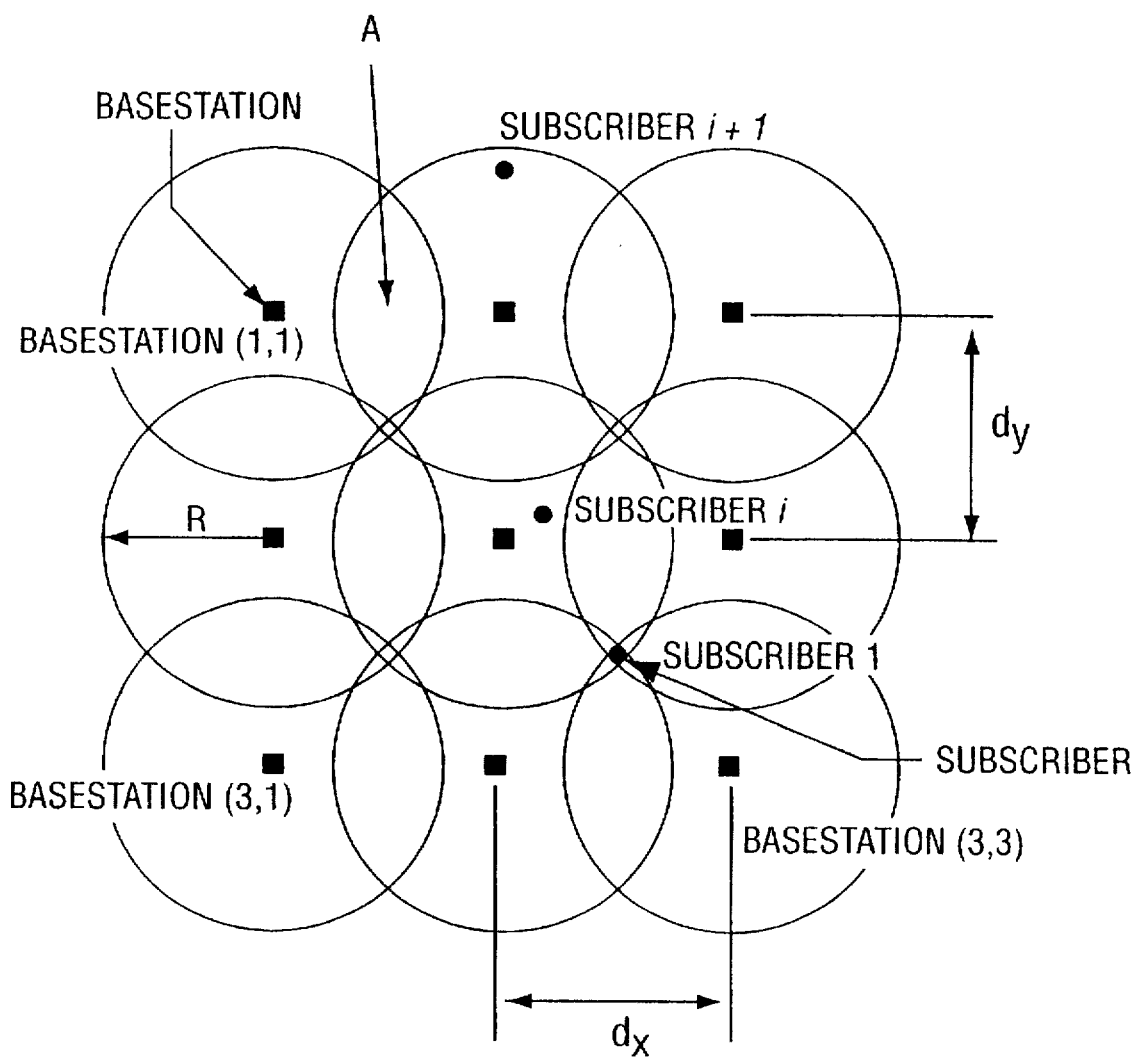
FIG. 1 is an illustration of a conventional idealized cellular basestation deployment.

FIG. 1 illustrates a conventional idealized cellular basestation deployment consisting of nine basestations (basestation(i,j) i,j=1,2,3) located on an equally spaced grid, and having a distance $d_x$ between adjacent basestations in the same row, and a distance $d_y$ between adjacent basestations in the same column. Each basestation is surrounded by a circle of radius R which indicates that basestation's cell or area of radio coverage. The coverage of the cells overlaps to ensure no gaps exist in the cell coverage within the service area of the system. In the example illustrated, R has been selected as approximately the minimum cell radius such that the service area is completely covered. Also shown are three subscriber locations labelled as subscriber 1, subscriber i, and subscriber i+1 at fixed locations within the service area. The three subscribers shown in FIG. 1 illustrate potential geometric relationships between a particular subscriber and nearby basestations. Subscriber 1 is equidistant between four basestations; subscriber i is nearest to basestation(2,2) but near to the coverage area of basestation(2,3); subscriber i+1 is closest to basestation(1,2). In general, a large number of subscribers will be randomly distributed across the service area. In conventional systems such as shown in FIG. 1, each subscriber will have an antenna pointing towards the basestation which is nearest to it. In FIG. 1, the antenna of subscriber 1 could be pointing to any one of basestations (2,2), (2,3), (3,2) and (3,3). The antenna of subscriber i would be pointing towards basestation(2,2), and the antenna of subscriber i+1 would be pointing towards basestation(1, 2). It is noted that the basestations shown in FIG. 1, and the basestations later described herein are depicted as being located on an idealized grid. In reality, the actual location of the basestations would be dictated by a number of factors including the availability of a mounting platform, volume of traffic etc. In most circumstances, the spacing between the basestations would not be uniform.

Radio propagation at extremely high frequencies (millimetre-wave and near millimetre-wave frequencies near and above 30 GHz) is highly directional and is subject to blockage. Temporal changes such as the foliage differences between summer and winter in temperate climates, the addition of man-made obstacles such as buildings which could be erected after establishment of the link, and weather conditions such as small storms tracking through a high frequency cellular system can all affect the radio link integrity. As a result of this, it may be the case that the best signal path for a given subscriber is not to the basestation to which it is physically closest, but possibly to another nearby basestation. In other circumstances co-channel interference may exist which can also be negated by pointing to another cell's basestation.

Overlap exists between cells in the service area. For example, the area A of FIG. 1 is the overlap of the cell for basestation(1,1) with the cell for basestation (1,2). If basestations (1,1) and (1,2) are transmitting at the same frequency, then a subscriber located in area A having an omnidirectional antenna will receive both signals and will be unable to distinguish between the two. For this reason, it is necessary for the subscriber to have a directional antenna capable of discriminating between which basestation it is receiving a signal from. This allows a given frequency to be reused by adjacent basestations.

The antenna directivity required to achieve the frequency reuse discussed above requires that the antenna be aligned to a basestation to properly establish a radio link. In existing systems, a technician must visit the subscriber premises to perform this alignment. In the event of a permanent obstruction arising after this alignment which causes the link to degrade or fail, a subsequent realignment by a technician is required. In the event that the signal path is temporarily obstructed, temporary degradation of the radio link will occur.

Figure 2:
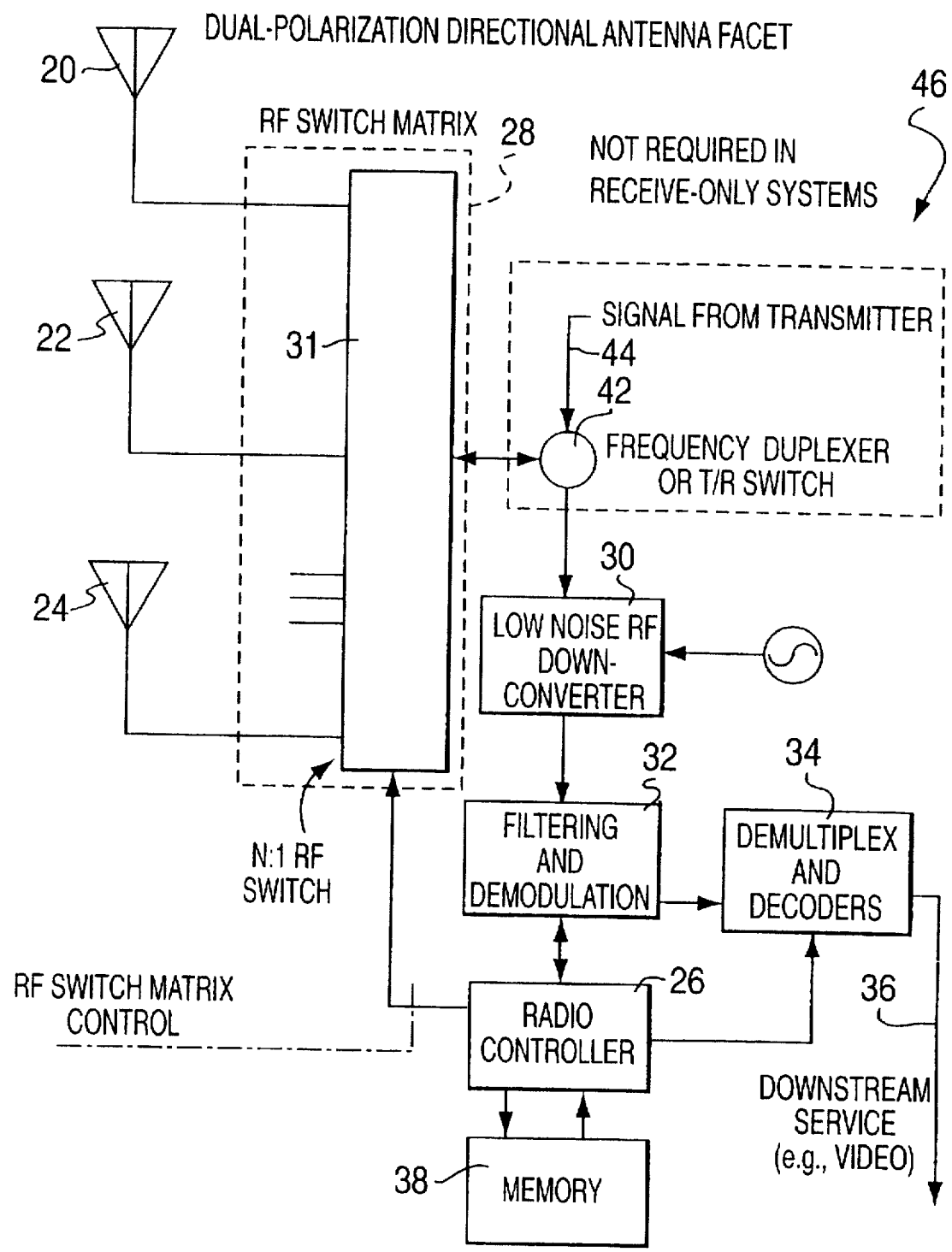
FIG. 2 is a partial block diagram of a subscriber antenna array and receiver according to the invention.

FIG. 2 is a partial block diagram for subscriber equipment employing a directional antenna according to the invention. Shown are three directional antenna facets 20,22,24 connected to an RF switch matrix 28. The RF switch matrix is connected to a digital radio transceiver 46 which in the illustrated embodiment consists of everything in the subscriber equipment except the antenna facets 20,22,24 and the RF switch matrix 28. The transceiver 46 includes a radio controller 26 which may for example be implemented with an ASIC (application specific integrated circuit). The controller 26 controls th rough the RF switch matrix 28 the facet from which the signal is to be received at a given time. In the illustrated embodiment, the RF switch matrix 28 consists of one N:1 RF switch 31 where N=3 is the number of antenna facets. The signal selected is routed through a low noise RF block downconverter 30 and a filtering and demodulating stage 32. The low noise RF block downconverter 30 receiver is equipped to downconvert a signal modulated at one of a set of preset frequencies used in the system. The filtering and demodulating stage 32 is connected to a demultiplexer and decoder stage 34 which produces the downstream service 36 which might be, for example a video signal. The radio controller 26 has access to a memory 38. If the system is to be a bi-directional one, then the additional components inside dotted box 41 are also required. In this case, the signal selected through the RF switch matrix 28 is passed through a frequency duplexer or transmit/receive switch 42 on its way to block 30. A signal 44 from a subscriber transmitter if present, (not shown) is also routed through the frequency duplexer or transmit/receive switch 42 on its way to one of the antenna facets 20,22,24 for transmission. If the system is receive only then the components inside box 41 are not required.

Figure 3:
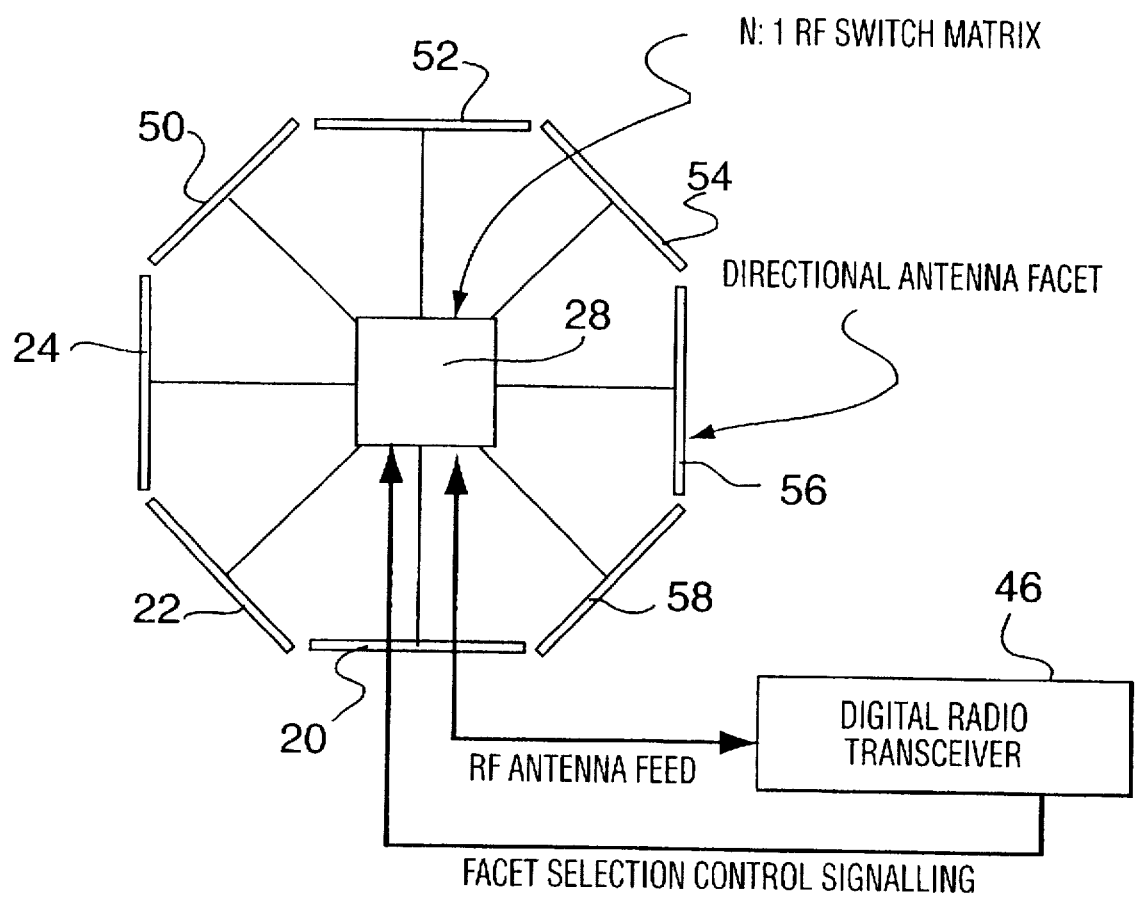
FIG. 3 is an illustration of a multi-facet antenna transceiver.

While the receiver of FIG. 2 is illustrated with an antenna array having three directional antenna facets 20,22,24, a preferred example of a multi-faceted antenna array is illustrated in FIG. 3, which shows 8 directional antenna facets 20,22,24,50,52,54,56 each having a 3 dB beamwidth of 45 degrees. The antenna facets are angularly spaced so as to provide an angular coverage area of 360°. Each antenna facet is shown connected to the RF switch matrix 28 which is connected to the digital radio transceiver 46. More generally, a set of N antenna facets will be used, with each antenna facet preferably having a 3 dB beamwidth of (angular coverage area)/N degrees. It is preferred but not essential that the angular coverage area be 360°. The number of facets that will be used in any given design will be dependent upon the gain and directivity required by the radio system. For bidirectional systems, each antenna facet may have a single component which functions both to receive and transmit, or may have separate receive and transmit components.

Figure 4:
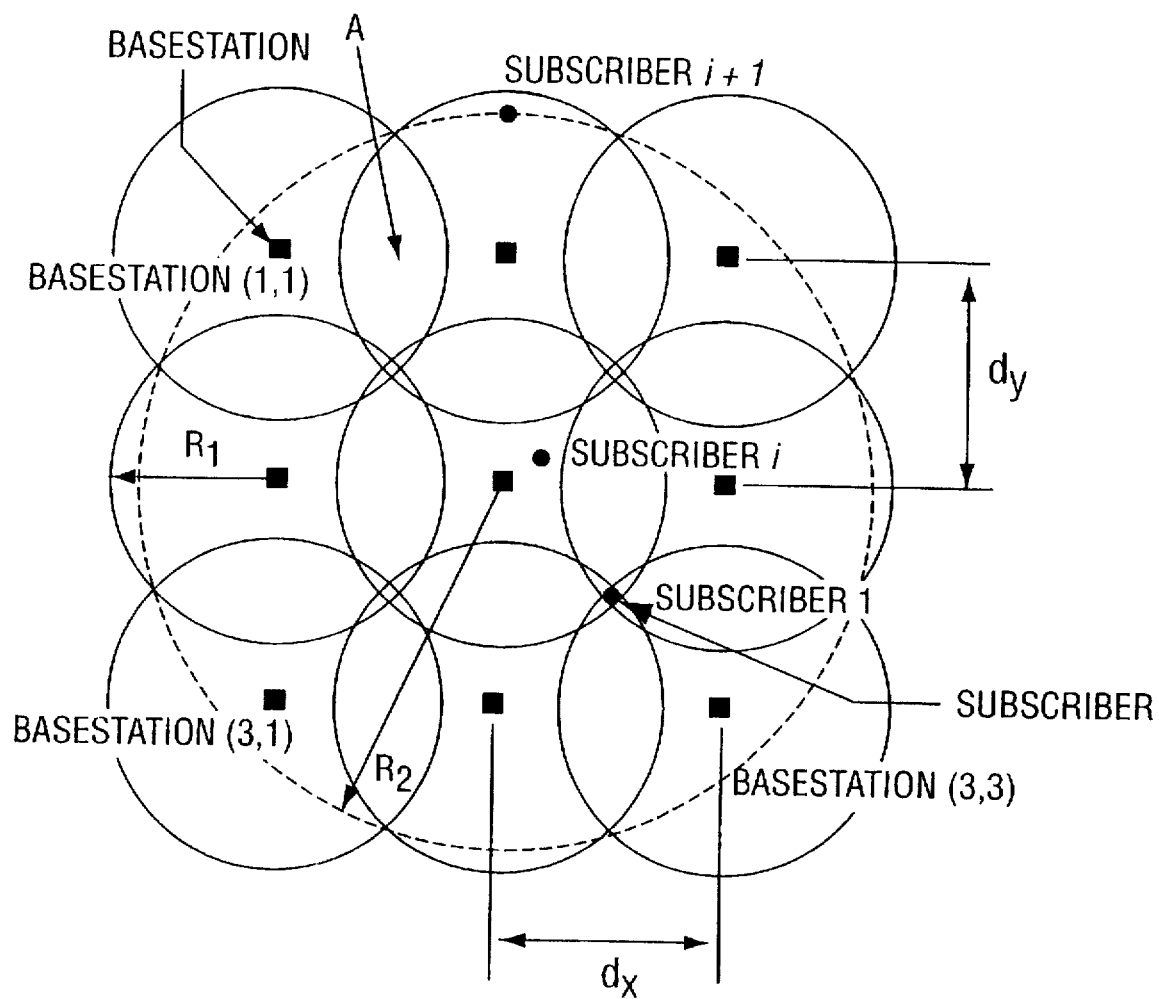
FIG. 4 is an illustration of an idealized cellular basestation deployment for use with the receiver of FIG. 2.

The subscriber equipment illustrated in FIG. 2 is particularly suited for use in the basestation deployment illustrated in FIG. 4. The physical deployment of the basestations in FIG. 4 is the same as that illustrated in FIG. 1. Each cell has a primary cell radius R1 and a secondary cell radius R2. The primary cell radius R1 is by definition the minimum cell radius such that any point within the service area is within a cell. The secondary cell radius R2 is the actual area of coverage of a cell. In the illustrated example, R2 is almost large enough to encompass the entire primary cell of each adjacent basestation.

Down tilt may be also employed to achieve basestation diversity. With down tilt, the basestation transmit antennas are tilted at an angle slightly away form being horizontal. The down tilt causes any transmitted signal to eventually hit the ground where most of it is absorbed. The secondary cell radius R2 is determined by the amount of down-tilt and by the signal strength. Down-tilt allows signals with longer signal strengths to be used while still being contained within the same secondary cell radius R2. Basestation diversity is another way of improving system reliability. With full basestation diversity, all points in the service area are within the range of more than one basestation. If the link to one of the basestations within range of a particular subscriber fails, then one of the other basestations within range may be used to assure continued communications. In order to permit basestation diversity down tilt is preferably employed in this system to confine the signals of a given basestation to that basestation's primary cell together with all the primary cells adjacent to that basestations's primary cell. In an idealized system this equates to the requirement for a secondary cell radius R2 which is equal to three times the primary cell radius R1.

In use, subscriber equipment such as that illustrated in FIG. 2 is installed in a location within one of the cells of FIG. 4. During initialization, the radio controller 26 selects in turn the RF signal from each of the N antenna facets 20,22,24 and measures their performance statistics, storing the statistics in memory 38. The performance statistics might include the signal level and the bit error rate for example. The radio controller 26 then calculates the mean performance statistics of each antenna facet based on the preset frequency sets that are used in the system. When all of the performance statistics have been gathered, the radio controller 26 prioritizes the performances, and selects the antenna facet with the best performance as the default configuration. At the same time it maintains the prioritized list in memory 38 so that a change in the default configuration to the next best configuration may be made at a later time if necessary.

Figure 5:
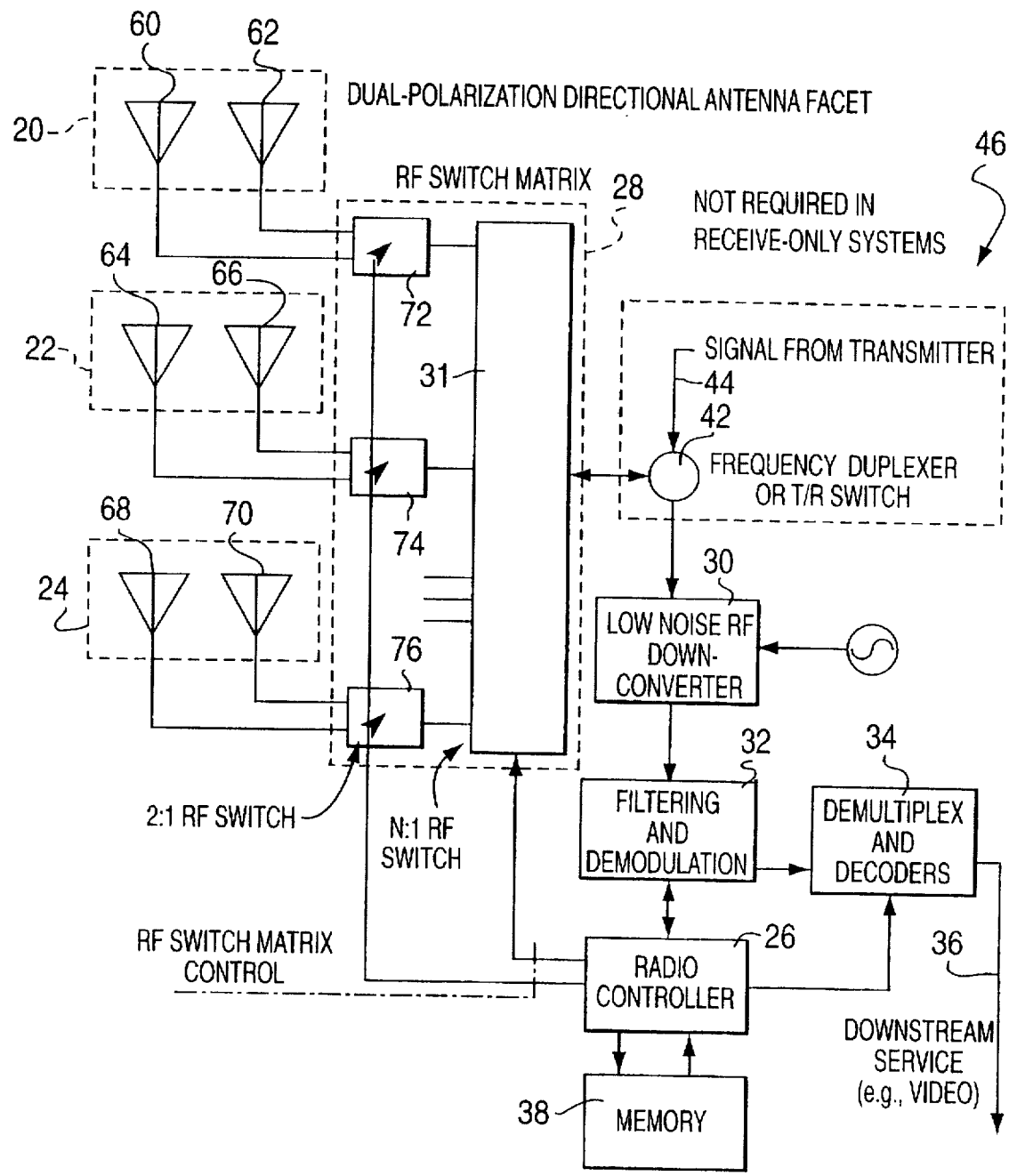
FIG. 5 is a partial block diagram of another antenna array and receiver according to the invention.

FIG. 5 is a partial block diagram for subscriber equipment employing a directional antenna according to another embodiment of the invention. Elements shown in FIG. 5 which are common with FIG. 2 have been similarly labelled. Shown are three dual-polarization directional antenna facets 20,22,24 connected to an RF switch matrix 28. Antenna facet 20 has a vertical polarization component 60 and a horizontal polarization component 62. Similarly, antenna facet 22 has orthogonal components 64,66 and antenna facet 24 has orthogonal components 68,70. The RF switch matrix 28 is connected to a digital radio transceiver 46 which in the illustrated embodiment consists of everything in the subscriber equipment except the antenna facets 20,22,24 and the RF switch matrix 28. The transceiver 46 includes a radio controller 26 which may for example be implemented with an ASIC (application specific integrated circuit). The controller 26 controls through the RF switch matrix 28 the facet from which the signal is to be received at a given time. In the illustrated embodiment, the RF switch matrix 28 consists of N 2:1 RF switches 72 and one N:1 RF switch 31 where N=3 is the number of antenna facets. The remainder of the receiver is the same as that described previously with reference to FIG. 2.

While FIG. 5 illustrates three directional antenna facets 20,22,24, an actual system would preferably use the previously described multi-faceted antenna array illustrated in FIG. 3, which shows 8 directional antenna facets 20,22,24, 50,52,54,56 each having a 3 dB beamwidth of 45 degrees. The antenna facets are angularly spaced so as to provide an angular coverage area of 360°. Each antenna facet comprises a pair of orthogonal components, one for receiving horizontal polarization signals, and the other for receiving vertical polarization signals. Alternatively, each facet could be a single dual polarization component. The orthogonal polarization components are connected to the RF switch matrix 28, and the particular polarization component to use for a given antenna facet is selected with the respective 2:1 RF switch 72. More generally, a set of N antenna facets will be used, with each antenna facet preferably having a 3 dB beamwidth of (angular coverage area)/N degrees. It is preferred but not essential that the angular coverage area be 360°. The number of facets that will be used in any given design will be dependent upon the gain and directivity required by the radio system. For bidirectional systems, the antenna facets may function both to receive and transmit, or may have separate receive and transmit components.

Figure 6:
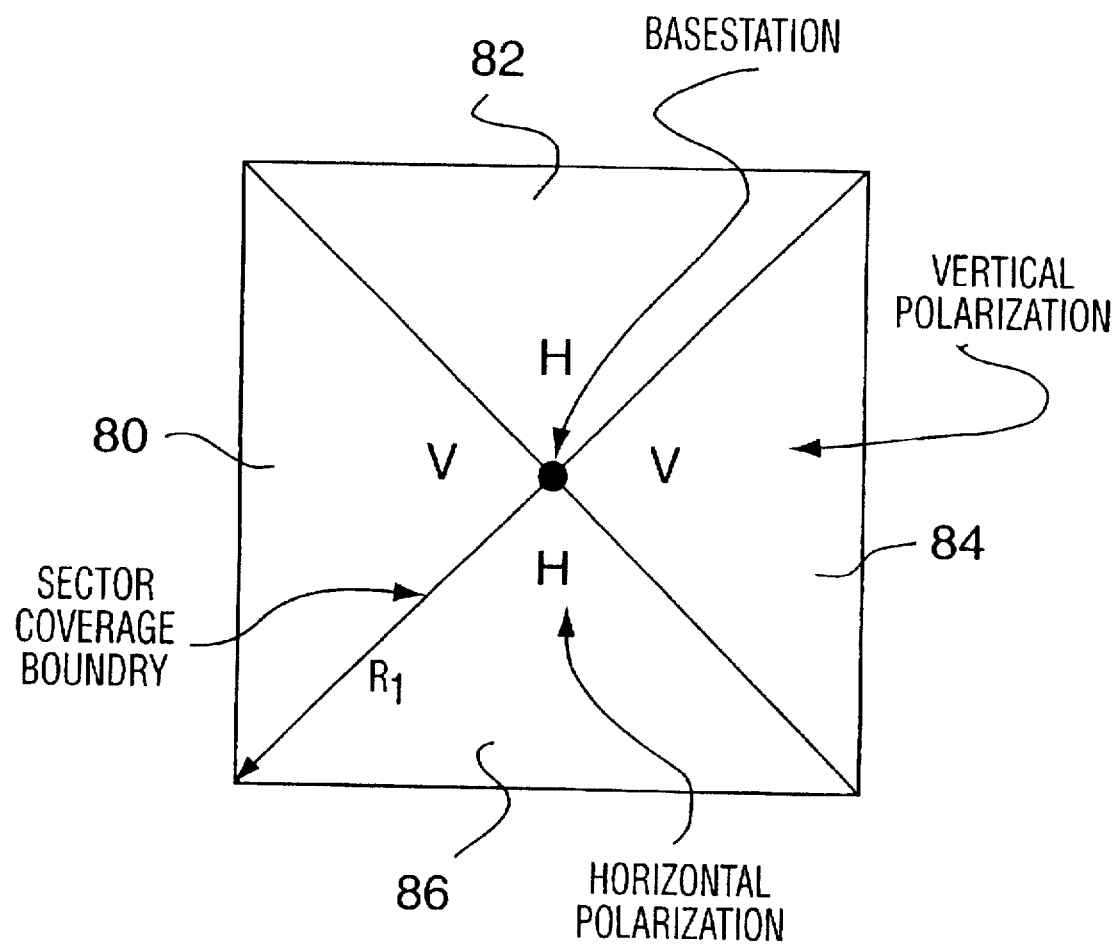
FIG. 6 is an illustration of a known sectorized basestation.

The subscriber equipment illustrated in FIG. 5 is particularly suited for use in a sectorized base station such as illustrated in FIG. 6. The sectorized basestation consists of a rectangular cell divided into four sectors 80,82,84,86. The diagonal connecting the basestation at the centre of the cell to one of the corners is the primary cell radius R1. The actual area of coverage extends to an area defined by a secondary cell radius R2 (not shown) which is preferably three times as large as R1. The secondary cell radius may be selected by using an appropriate down tilt as described previously. More generally, the number of sectors in each basestation is an even number (2,4,6, . . . ) which allows adjacent sectors in a basestation to have orthogonal polarizations. In FIG. 6, sectors 80,84 have vertical polarizations as indicated by the letter "V", and sectors 82,86 have horizontal polarizations as indicated by the letter "H". More generally, other orthogonal polarizations could also be employed such as Linear Slant Right and Linear Slant Left, or Right and Left Circular polarizations.

Figure 7:
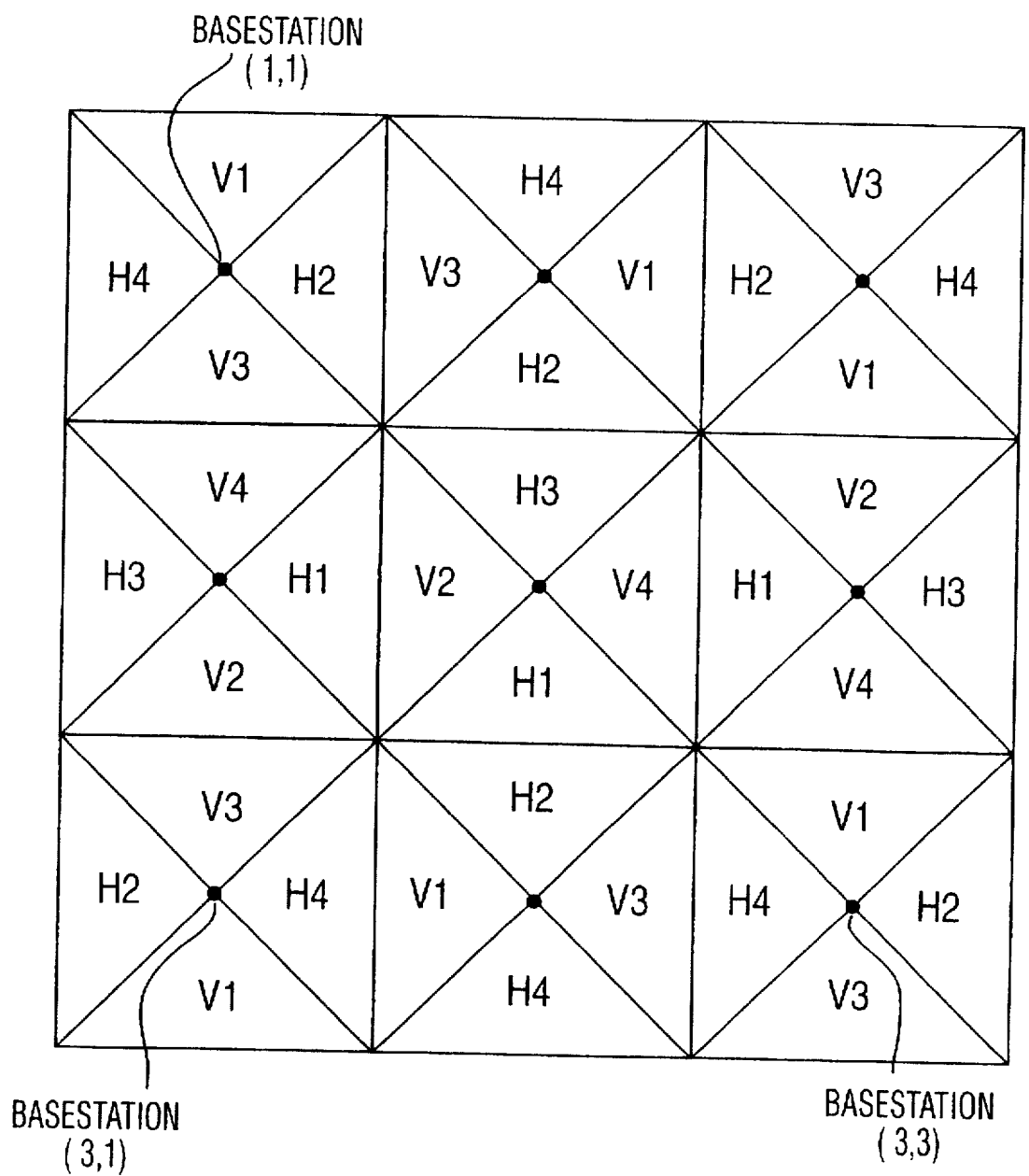
FIG. 7 is an illustration of a known frequency reuse pattern using orthogonal polarizations.

A system of cells is shown in FIG. 7 each of which has a sectorization such as that shown in FIG. 6. The basestations are labelled as in FIG. 1, and as in FIG. 6, sectors labelled with V have vertical polarization, while sectors labelled with H have horizontal polarizations. For a given basestation, the entire spectrum available to the system is divided up among the sectors of that basestation. In the illustrated embodiment, the spectrum has been divided into four frequency sets. The number following the V or H indicates the frequency set to be used in that sector. Thus, all sectors labelled V1, for example, will have the same polarization and frequencies.

In the embodiment illustrated, the frequency pattern is rotated through the sectors along rows of basestations. For example, the sectors in basestation(1,2) have been rotated 90 degrees with respect to the sectors of basestation (1,1). In addition, the polarization pattern alternates between adjacent rows of basestations. For example, the first row of basestations employs vertical polarization for frequency sets 1 and 3, and horizontal polarization for frequency sets 2 and 4 (V1,H2,V3,H4), while the second row of basestations employs horizontal polarization for frequency sets 1 and 3, and vertical polarization for frequency sets 2 and 4 (H1,V2, H3,V4).

To improve Carrier-to-Interference performance, the basestation antennas may employ down tilt. The effect of down tilt is to allow a higher signal power to be transmitted without interfering with adjacent cells.

In use, subscriber equipment such as that illustrated in FIG. 5 is installed in a location within one of the cells of FIG. 7. During initialization, the radio controller 26 selects in turn the RF signal from each of the N antenna facets 20,22,24 for each polarization and measures their performance statistics, storing the statistics in memory 38. The performance statistics might include the signal level and the bit error rate for example. The radio controller ASIC 26 then calculates the mean performance statistics of each antenna facet based on the preset frequency sets that are used in the system. When all of the performance statistics have been gathered, the radio controller ASIC 26 prioritizes the performances, and selects the antenna facet, polarization and frequency with the best performance as the default configuration. At the same time it maintains the prioritized list in memory 38 so that a change in the default configuration to the next best configuration may be made at a later time if necessary.

By using sectorization, all of the available frequency spectrum may be used by each basestation. This leads to a much more efficient use of frequency than in a system with basestation diversity and no sectorization. In "Microwave Mobile Communications", W. C. Jakes, 1974, the particular arrangement of polarizations described has been shown to provide the maximum signal level and the best reduction of co-channel interference with basestation diversity.

With the use of sectorization and directional antennas at the subscriber site the entire frequency band can be utilized by a single basestation. Unlike some other systems, high directivity with antenna beamwidths of less than 5 degrees in azimuth are not required. In the system illustrated in FIG. 5, a subscriber antenna 3 dB beamwidth of 23 degrees azimuth is possible without degrading performance. A larger beamwidth eases the alignment of the subscriber antenna and permits an antenna design with easily achievable sidelobe performance.

Although rain depolarizes radio signals, the present system is preferably for operation in the millimetre-wave and near millimetre-wave frequencies, and at these frequencies rain also causes significant signal attenuation. The combination of depolarization and signal attenuation is known to maintain a level of co-channel interference rejection throughout all conditions.

The above includes descriptions of an embodiment of the invention in which non-sectorized basestations are used, and an embodiment of the invention in which sectorized basestations are used. The details which follow apply to both of those embodiments unless otherwise noted.

In the case of bi-directional communications, the subscriber unit will register itself on the network so that point-to-point voice and or data traffic can be routed to the appropriate basestation.

In bidirectional traffic systems, separate uplink channels are used and arranged in a similar pattern as the downlink channels. In the embodiment with sectorized basestations, uplink and downlink channels are preferably of the same polarization to simplify the implementation of subscriber equipment, and particularly the subscriber transceiver system. It is possible to use the opposite (orthogonal) polarization to improve frequency re-use performance or reduce desensitization of subscriber equipment receiver due to the leakage from its own transmitter unit. Upstream traffic may be transmitted with a multiple access protocol such as TDMA or CDMA to improve the management of the upstream spectrum, although the use of FDMA could be employed if required.

By using a multi-faceted directional antenna, the requirement for a technician to visit the subscriber location to adjust the antenna is substantially reduced or eliminated. The multi-faceted antenna has the ease of deployment of an omnidirectional antenna while possessing the gain and directivity of a directional antenna.

The above describes system and method whereby a subscriber unit independently makes a selection as to which basestation to use by optimizing its own individual reception capabilities. This eliminates the requirement for manual antenna deployment but does not solve the problem of potential congestion occurring at a particular basestation due to a higher than average number of subscribers in close proximity to that basestation. To solve this, in a preferred embodiment of the invention, the selection of the optimal basestation is made in cooperation with the system as a whole. After making the performance measurements for each of the facets of the subscriber antenna, in a basestation diversity system, several configurations other than the best performing configuration will likely still provide a level of performance which is acceptable. These configurations are transmitted to the basestation on a signalling channel. In this case, the system can redistribute subscribers among the available basestations so as to more evenly distribute the traffic load. After determining which basestation should be serving a given subscriber unit the system instructs the subscriber unit which antenna configuration to use by sending a command over the signalling channel. The radio controller 26 must be equipped to send the configuration information to the system, and to receive and process instructions from the system.

Preferably the system registers a user in a manner similar or identical to methods used in cellular systems such as GSM and North America cellular (AMPS, TMDA, or CDMA).

The polarization data of basestation selection at the subscriber unit is recorded by the network simultaneously as they are determined by the subscriber unit. When the link fails for a period of time longer than a predetermined period, both the subscriber unit and Network may initiate a search to re-establish connection at the alternative basestation. Since the selection process has been initiated by a long term loss of service, the system may at a predetermined time at night, 3am for example start a search process to re-establish connection. The system, however could be provisioned to do this at any time of day.

Since there is the possibility that there will also be a loss of synchronization between the basestations and the subscriber unit, the network will transmit signals from all predetermined basestation attempting to re-establish connection. Upon receiving the transmission form the basestation previously selected by the subscriber unit network connection will be re-established, the prioritization database will be updated and normal service will resume.

In scenarios where the system is highly loaded, there may be an overall change in the grade-of-service provided to a set of customers. In that event, other customers could be re-routed to other basestations, based on a connection priority database in which each subscriber has a connection priority with respect to other subscribers, to redistribute the traffic load in a manner similar to what has been described previously.

Various improvements to the above described procedure may be made in order to handle temporary or permanent alterations in the signal strength of the default antenna settings. These improvements as discussed below, are considered to be options which are not essential to the invention in its broadest sense.

In the event that the RF signal on the system default setting degrades for a period of time exceeding a specified duration it may be possible for the radio system controller to select the next best performing system configuration. If the next best link degrades it will return to the preset "best" link; if it is still operating below performance requirements, it is possible to select and alternate setting (the 3rd best link).

In one configuration, after a programmed period of time the system returns to the default setting. The programmed period of time can be set such that basestation switching does not unacceptably degrade the user's performance of the service.

In the case of long term degradation of the default link, the system might be configured to re-scan all available basestations and reprioritize its selections, creating a new default selection. This may be required when a new large obstacle such as a building is erected.

In multi-facet antennas as described above, a wider 3 dB bandwidth reduces the number of antenna facets required, simplifying and thus reducing cost of the subscriber premises antenna.

Numerous modifications and variations of the present invention are possible in light of the above teachings. It is therefore to be understood that within the scope of the appended claims, the invention may be practised otherwise than as specifically described herein.

For example, for the subscriber antenna, rather than having a plurality of antenna facets arranged in a permanent configuration which covers a 360° range, a single antenna facet which is rotatable to point in various directions could instead be employed. In such an embodiment, the antenna facet would be rotated by a servomotor for example, under the control of the radio controller to each of a finite number of spaced angular positions each of which would assume the roll previously filled by one facet in the multi-facet array. Of course, the number of antenna positions could be made very large such that an almost continuous set of positions exist.

The embodiments of the invention in which an exclusive property or privilege is claimed are defined as follows:

1. A directional antenna system for allowing access from a subscriber location to a fixed-access wireless communications system having a plurality of basestations, the system comprising:

a plurality of angularly spaced directional antenna facets each capable of receiving discriminately for a plurality of frequency sets two RF signals having orthogonal polarizations;

a receiver for receiving from an antenna facet selected from said plurality of antenna facets an RF signal generated by one of the basestations;

performance measuring means for determining the performance of each antenna facet with each polarization and each frequency set; and subscriber prioritizing means for prioritizing the performance of all of the antenna facets for each polarization and frequency set and selecting as a default configuration the best performing antenna facet, polarization and frequency set.

2. A system according to claim 1 wherein said orthogonal polarizations are horizontal and vertical.

3. A fixed-access wireless communications system comprising:

a plurality of basestations each sectorized directionally into an even number of regions such that each region has one of two orthogonal polarization types, and such that adjacent regions have orthogonal polarization types each basestation having a corresponding primary cell radius and secondary cell radius the primary radius being the minimum cell radius such that an entire service area is covered by at least one cell, the secondary radius being the actual coverage radius wherein the secondary cell radius of the basestations is such that each point in a defined service area is within the secondary cell radius of coverage of each of at least two basestations;

at least one subscriber equipment apparatus comprising:
   i. a plurality of angularly spaced directional antenna facets each capable of receiving discriminately RF signals having each of said two orthogonal polarizations types;
   ii) receiving means for receiving an RF signal generated by one of the basestations from an antenna facet selected from said plurality of antenna facets;
   iii) performance measuring means for determining the performance of each antenna facet with each polarization; subscriber prioritizing means
   iv) subscriber prioritizing means for prioritizing into a list the performance of all of the antenna facets and polarizations and selecting one of the antenna facets with a particular polarization as a default configuration to be used for reception.

4. A system according to claim 3 wherein said default configuration is the best performing antenna facet and polarization combination in the list.

5. An apparatus according to claim 3 wherein each antenna facet is capable of receiving discriminately for a plurality of frequency sets two RF signals having each of said two orthogonal polarization types;

wherein the performance measuring means measures the performance of each antenna facet with each polarization and each frequency set;

the subscriber prioritizing means prioritizes the performance of all of the antenna facets for each selected polarization and frequency set and selects as a default configuration the one of the antenna facets, with a particular polarization and a particular frequency set.

6. A system according to claim 5 wherein said default configuration is the best performing antenna facet, polarization and frequency combination in the list.

7. A fixed-access wireless communications system comprising:

a plurality of basestations each having a corresponding primary cell radius and secondary cell radius the primary radius being the minimum cell radius such that an entire service area is covered by at least one cell, the secondary radius being the actual coverage radius;

at least one subscriber equipment apparatus comprising:
   i) a plurality of angularly spaced directional antenna facets;
   ii) receiving means for receiving an RF signal generated by one of the basestations from an antenna facet selected from said plurality of antenna facets;
   iii) performance measuring means for determining the performance of each antenna facet;
   iv) subscriber prioritizing means for prioritizing into a list the performance of all of the antenna facets;
   v system prioritizing means which, together with said subscriber prioritizing means selects a default configuration based upon providing acceptable performance to said subscriber equipment while at the same time attempts where possible to evenly distribute traffic among the basestations.

8. A fixed-access wireless communications system comprising:

a plurality of basestations each having a corresponding primary cell radius and secondary cell radius the primary radius being the minimum cell radius such that an entire service area is covered by at least one cell, the secondary radius being the actual coverage radius;

at least one subscriber equipment apparatus comprising:
   i) a plurality of angularly spaced directional antenna facets capable of receiving discriminately for a plurality of frequency sets two RF signals having orthogonal polarizations;
   ii) receiving means for receiving an RF signal generated by one of the basestations from an antenna facet selected from said plurality of antenna facets;
   iii) performance measuring means for determining the performance of each antenna facet with each polarization and each frequency set;
   iv) subscriber prioritizing means for prioritizing into a list the performance of all of the antenna facets for each polarization and frequency set and selecting as a default configuration the best performing antenna facet, polarization and frequency set; and v) means for detecting when the selected configuration is performing below an acceptable level, and for selecting the next best performing configuration in the list when such a detection is made.

9. A fixed-access wireless communications system comprising:

a plurality of basestations each having a corresponding primary cell radius and secondary cell radius the primary radius being the minimum cell radius such that an entire service area is covered by at least one cell, the secondary radius being the actual coverage radius;

at least one subscriber equipment apparatus comprising:
 i) a plurality of angularly spaced directional antenna facets;
 ii) receiving means for receiving an RF signal generated by one of the basestations from an antenna facet selected from said plurality of antenna facets;
 iii) performance measuring means for determining the performance of each antenna facet;
 iv) subscriber prioritizing means for prioritizing into a list the performance of all of the antenna facets; and
 v) means for detecting when the selected configuration is performing below an acceptable level, and for selecting the next best performing configuration in the list when such a detection is made;
 vi) means for determining when a preset period of time in said next best performing configuration has elapsed, wherein the default configuration is reselected at that time.

10. A method for selecting a default antenna configuration for use in receiving an RF signal comprising the steps of:

for each of a plurality of angularly spaced directional antenna facets, receiving the RF signal through the antenna facet;

measuring the performance of each antenna facet for a plurality of frequency sets;

prioritizing the performance of all the antenna facets and frequency sets;

selecting as the default antenna configuration the best performing antenna facet and frequency set;

monitoring the performance of the selected default antenna configuration;

switching to another antenna configuration if the performance of the selected default antenna configuration fail to satisfy a predetermined criterion;

measuring a timeout period after switching to said another antenna configuration;

after expiry of said timeout, switching back to said default antenna configuration.

11. A method for selecting a default antenna configuration for use in receiving an RF signal comprising the steps of:

for each of a plurality of angularly spaced directional antenna facets, receiving the RF signal through the antenna facet for each of two orthogonal polarizations of the antenna facet;

measuring the performance of each antenna facet for each polarization and for each of a plurality of frequency sets;

prioritizing the performance of all of the antenna facets frequency sets and polarizations;

selecting as a default antenna configuration the best performing antenna facet, frequency set and polarization.

12. A method according to claim 11 further comprising the steps of:

monitoring the performance of the selected default antenna configuration;

switching to another antenna configuration if the performance of the selected default antenna configuration fails to satisfy a predetermined criterion.

13. A method according to claim 12 further comprising the steps of:

measuring a timeout period after switching to said another antenna configuration;

after expiry of said timeout, switching back to said default antenna configuration.

* * * * *

UNITED STATES PATENT AND TRADEMARK OFFICE
CERTIFICATE OF CORRECTION

PATENT NO. : 5,903,826
DATED : May 11, 1999
INVENTOR(S) : RICHARD JOSEPH NOWAK

It is certified that error appears in the above-identified patent and that said Letters Patent is hereby corrected as shown below:

Column 12, line 4 (Claim 10): change "fail" to "fails"

Signed and Sealed this

Twenty-first Day of March, 2000

*Attest:*

*Attesting Officer*

Q. TODD DICKINSON

*Commissioner of Patents and Trademarks*